United States Patent [19]

Sparks

[11] 4,037,853

[45] July 26, 1977

[54] DELIVERY BICYCLE-TRAILER

[76] Inventor: Carl K. Sparks, 227 Richardson Drive, Mill Valley, Calif. 94941

[21] Appl. No.: 692,666

[22] Filed: June 4, 1976

[51] Int. Cl.[2] .............................................. B62K 27/00

[52] U.S. Cl. ...................................... 280/204; 280/40; 280/47.37 R

[58] Field of Search ..................... 280/204, 7.15, 7.16, 280/202, 40, 42, 652, 47.37, 47.18, 47.24, 482

[56] References Cited

U.S. PATENT DOCUMENTS

| | | | |
|---|---|---|---|
| 2,617,670 | 11/1952 | Welsh | 280/47.37 R |
| 3,100,120 | 8/1963 | Cleary | 280/204 |

FOREIGN PATENT DOCUMENTS

| | | | |
|---|---|---|---|
| 76,770 | 7/1948 | Czechoslovakia | 280/40 |
| 878,044 | 1/1943 | France | 280/204 |

*Primary Examiner*—Joseph F. Peters, Jr.
*Assistant Examiner*—Donn McGiehan
*Attorney, Agent, or Firm*—Fitch, Even, Tabin & Luedeka

[57] ABSTRACT

A delivery trailer adapted to alternatively be pulled by a bicycle, to be operated as a hand truck or to be collapsed for compact mounting upon the bicycle when not in use. In order to adapt the bicycle-trailer combination for carrying substantial loads, the bicycle has a structural portion of its frame extending rearwardly above its back wheel to provide a mount for the trailer, the collapsible trailer including a parallelogram linkage with associated bracing as well as other features to adapt it for carrying heavy loads.

12 Claims, 5 Drawing Figures

10 12 28 90 92 93 14 94 96 20 22 91 26 24 18 16

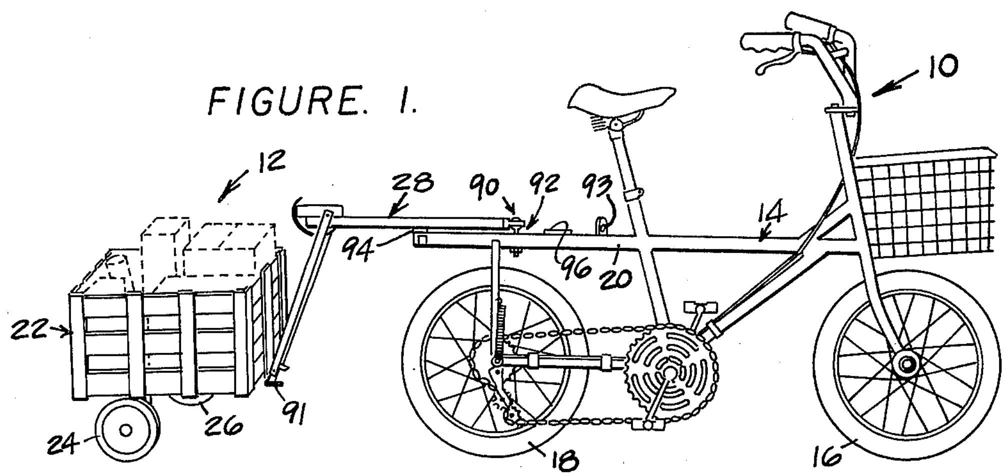
FIGURE. 1.
12
28
90
92
93
14
10
94
96
20
22
24
26
91
18
16
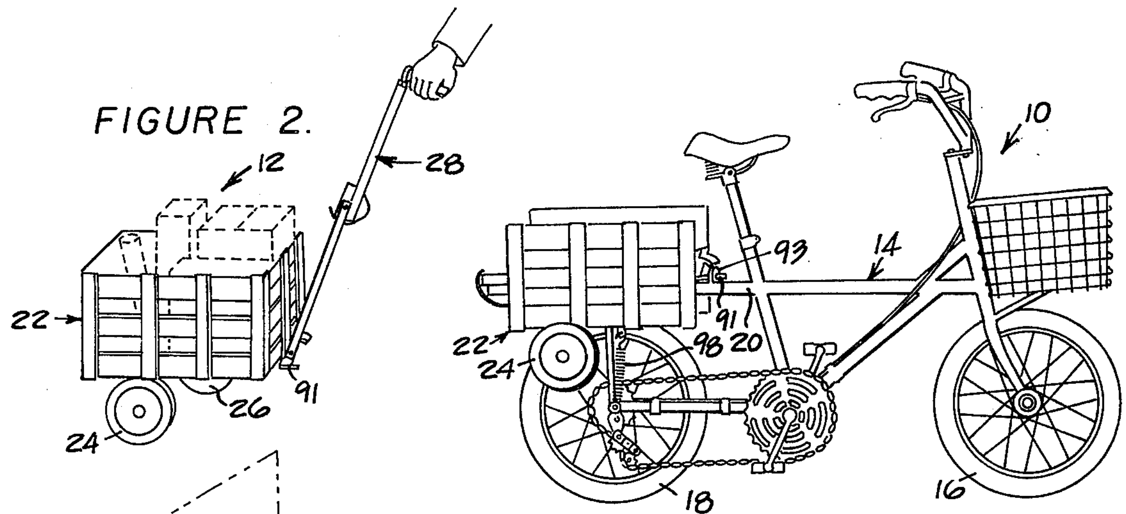
FIGURE 2.
12
28
22
24
26
91
10
93
14
91
20
22
24
98
18
16
FIGURE 3.
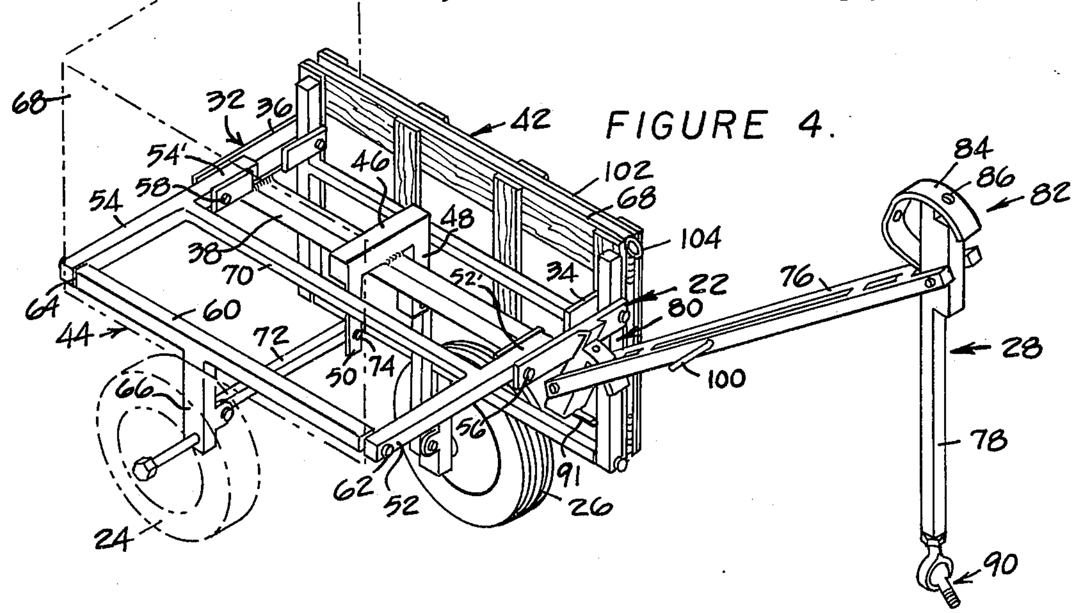
12
FIGURE 4.
68
32
36
54'
58
54
46
42
102
68
104
48
38
70
52'
34
22
76
84
86
82
64
60
80
44
72
50
74
28
66
100
56
78
91
62
52
26
24
90

90
78
82
100
86
84
86
88
28
76
88
91
34
38
80

DELIVERY BICYCLE-TRAILER

BACKGROUND OF THE INVENTION

The present invention relates to a bicycle-trailer combination and more particularly to such a combination wherein the trailer may be either pulled behind the bicycle to carry substantial loads, operated as a hand truck or collapsed for mounting upon the bicycle when not in use.

Bicycle-trailer combinations have been found to be quite useful since the trailer may be employed to carry a substantial load behind the bicycle, the trailer having a much lower center of gravity for carrying substantial loads which would tend to cause imbalance if the same load were carried at a greater height upon the bicycle itself.

Such bicycle-trailer combinations have been found to be of even greater use when the trailer may be collapsed and stored in place upon the bicycle when not is use. Most commonly, the trailer may be mounted directly above the rear wheel of the bicycle. The design and construction of a collapsible trailer of this type, however, introduces additional problems particularly when the trailer must also be designed to carry substantial loads. The construction of the trailer permitting it to be collapsible in the manner described above may also tend to cause weakness in the trailer when it is carrying substantial loads.

SUMMARY OF THE INVENTION

Accordingly, it is an object of the present invention to provide a delivery bicycle-trailer combination capable of operation in the manner described above while avoiding one or more of the problems discussed above.

It is another object of the invention to provide a collapsible trailer which may alternatively be employed as a delivery trailer to be towed behind a bicycle or the like as well as being employable as a hand truck while further being collapsible for storage upon the bicycle when not in use.

It is a further object of the invention to provide such a trailer of collapsible construction whereby the trailer may be compactly mounted above a portion of the bicycle or the like while also being extended for use in carrying various articles, the trailer including bracing means to provide reinforcement in its extended form in order to accommodate substantial loads.

It is a further object of the invention to provide a collapsible delivery trailer including a pivoted draw bar which may be alternatively employed for connecting the trailer to a bicycle and for manual use in operating the trailer as a hand truck, the draw bar being pivotable into another position to facilitate collapse of the trailer into a more compact unit for mounting upon the bicycle.

It is a more specific object of the invention to provide a collapsible trailer of the type referred to above wherein the trailer includes a bridge portion for spanning the rear wheel of the bicycle to facilitate its compact storage thereon, the trailer further including a parallelogram linkage and associated bracing which permits the trailer wheels to be pivoted outwardly for extending the trailer and adapting it to receive and support substantial loads.

It is an even further object of the invention to provide a delivery bicycle-trailer combination wherein the bicycle includes a structural portion of its frame extending rearwardly above its rear wheel to provide a heavy duty mount for the trailer. The rearwardly extending structural portion also serves as a means for securely supporting the trailer when it is collapsed and carried on the bicycle.

Additional objects and advantages of the invention are made apparent in the following description having reference to the accompanying drawings.

BRIEF DESCRIPTION OF THE DRAWINGS

FIG. 1 is a side view in elevation of the bicycle-trailer combination with the trailer being extended and further illustrated in a position to be towed behind the bicycle.

FIG. 2 illustrates the trailer along with its draw bar being repositioned to facilitate operation of the trailer as a hand truck.

FIG. 3 also illustrates the bicycle-trailer combination of FIG. 1 with the trailer being collapsed and mounted above the rear wheel of the bicycle.

FIG. 4 is a detailed view of the trailer with one side portion of the trailer being illustrated in a collapsed configuration, the other side portion of the trailer being illustrated in an extended configuration suitable for carrying a load, portions of the trailer being broken away to more clearly illustrate its construction.

DESCRIPTION OF THE PREFERRED EMBODIMENT

Figure 5:
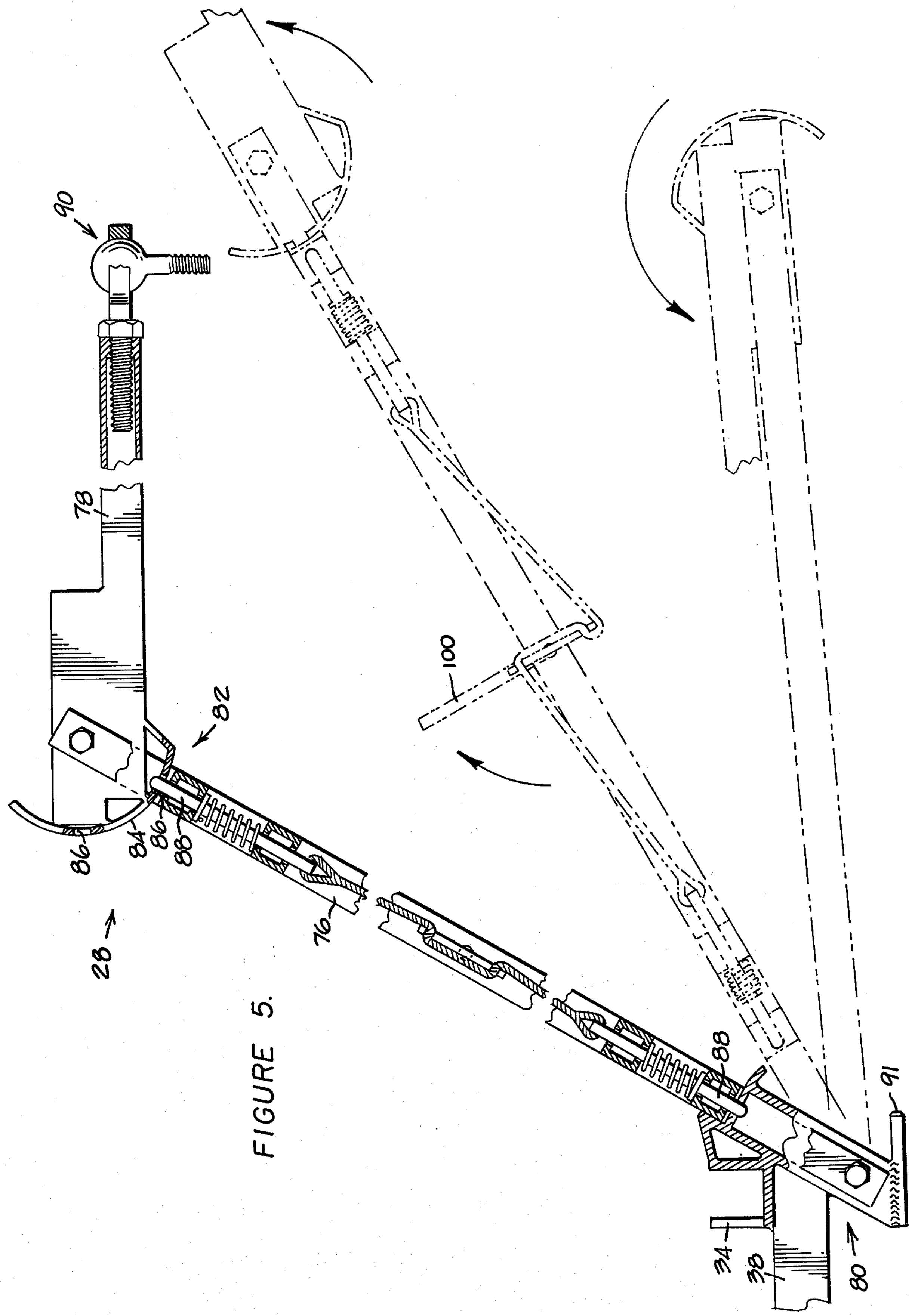
FIG. 5 is a detailed fragmentary view, with parts broken away, of a draw bar for the trailer.

A bicycle-trailer combination according to the present invention includes a bicycle as indicated at 10 in FIG. 1, and a trailer as indicated at 12 in FIG. 1. The bicycle 10 is of generally conventional configuration in that it includes a frame 14 and front and rear wheels 16 and 18.

In order to adapt the bicycle for operation with the trailer of the present invention, a structural portion 20 of the bicycle frame 14 extends rearwardly above the rear wheel 18 to provide a heavy duty hitch for the trailer 12. At the same time, the structural portion 20 also provides means for supporting the trailer 12 when it is collapsed and stored above the rear wheel 18 in a manner described in greater detail below.

The trailer 12 includes a body 22, wheels 24 and 26, and a draw bar 28. The trailer 12 is particularly adapted for use in the three modes illustrated respectively in FIGS. 1, 2 and 3. As illustrated in FIG. 1, the trailer may be towed behind the bicycle and carry a relatively substantial load. The load carrying capacity of the bicycle is greatly enhanced since a similar load would be difficult to carry in a relatively elevated position upon the bicycle.

The trailer 12 may also be operated in the manner illustrated in FIG. 2, the draw bar 28 being repositioned to adapt the trailer for use as a hand cart.

Finally, the body 22 of the trailer is either extendible into the configuration illustrated in FIG. 1 or collapsible into the configuration illustrated in FIG. 3 for mounting upon the bicycle when the trailer is not in use. The construction of the trailer body 22 permits it to be collapsible while providing support for substantial loads of as much as 100-200 pounds as described in greater detail below.

Referring now to FIG. 4, the body 22 for the trailer 12 includes a central bridge portion 32 extending the length of the trailer with channel members 34 and 36 arranged respectively at the front and rear of the trailer.

The channel members 34 and 36 are interconnected by a longitudinal beam 38 and face upwardly to provide reinforcing support for side portions 42 and 44 of the trailer when the trailer is in the extended configuration illustrated in FIG. 1. In FIG. 4, the side portion 44 of the trailer is also illustrated in an extended configuration.

The length of the channel members 34 and 36 determines the width of the bridge portion 32 which is selected to span the rear bicycle wheel 18 and associated portions of the bicycle. The bridge portion 32 also includes a centrally arranged lateral member 46 with rigid posts 48 and 50 extending downwardly from opposite ends thereof for a purpose described in greater detail below.

The two trailer side portions 42 and 44 are of similar construction. Accordingly, the trailer side portion 44 is described immediately below and it will be understood that the other trailer side portion 42 includes the same components arranged in the same relation on the opposite side of the trailer. The trailer side portion 44 is of fabricated construction including end bars 52 and 54 which are pivotably interconnected at 56 and 58 at the adjacent ends of the channel members 34 and 36. The end bars 52 and 54 include extension 52' and 54' respectively, which extend beyond the pivot points 56 and 58 for overlapping engagement with the channel members 34 and 36. Thus, when the trailer side portion 44 is extended into the configuration illustrated in FIG. 4, additional reinforcing support is provided by the respective overlapping arrangement of the end bars 52 and 54 with the channel members 34 and 36.

The trailer side portion 44 also includes a longitudinal member 60 which is pivotably connected at 62 and 64 with the extending end of the end bar 52 and 54. A bracket for mounting the trailer wheel 24 is rigidly interconnected with the longitudinal member 60. A side panel 68 is also rigidly interconnected with the longitudinal member 60 to provide an enclosure for parcels carried upon the trailer. In addition, the trailer side portion 44 includes an intermediate longitudinal member 70 which cooperates with the longitudinal member 60 and the center longitudinal beam 38 to form a floor for the trailer in its extended configuration.

The vertical attitude of the longitudinal member 60 and the rigidly connected wheel bracket 66 and side panel 68 is maintained by means of a parallelogram linkage between the member 60 and the bridge portion 32. The parallelogram linkage is formed by an additional link 72 which is pivotably interconnected at one end with the wheel bracket 66 at a point below the longitudinal member 60. The other end of the link 72 is pivotably interconnected at 74 with the lower end of the post 50. In this manner, the link 72 is arranged in parallel and offset relation with the end bars 52 and 54. Thus, a parallelogram linkage is formed which comprises the link 72 and an opposite side of the parallelogram formed by both of the end bars 52 and 54. The additional two sides of the parallelogram are formed by the post 50 and a portion of the wheel bracket 66.

When the trailer side portion 44 is arranged in its extended configuration as shown in FIGS. 4 and 1, the parallelogram linkage causes the wheel bracket 66 and side panel 68 to remain in the same vertical alignment as when the trailer is collapsed. The collapsed configuration is illustrated by the other trailer side portion 42 where the side panel 68 and wheel bracket 66 are similarly illustrated as being vertically aligned.

In order to further adapt the trailer for operation in the three modes referred to above and illustrated respectively in FIGS. 1, 2 and 3, the draw bar 28 includes two elongated portions 76 and 78. The first draw bar portion 76 is pivotably interconnected to the middle of the forward channel member 34 as indicated at 80. An additional pivot connection 82 is provided between the two draw bar portions 76 and 78.

Each of the pivots 80 and 82 includes a curved cam member 84 having one or more stops 86 arranged for interlocking engagement with a spring loaded pin 88. The cam member 84 for the pivot connection 82 includes two separate stops such as that indicated at 86 for locking the draw bar portions 76 and 78 in either the angled configuration of FIG. 1 or the straight configuration of FIG. 2.

The forward draw bar portion 78 may also be doubled completely back on top of the other draw bar portion 76 (as viewed for example in FIG. 4). With the two draw bar portions folded together in that manner, the rearward draw bar portion 76 may then be folded beneath the bridge portion 32 of the trailer in order to further facilitate mounting of the trailer upon the bicycle as illustrated in FIG. 3.

The forward draw bar portion 78 includes a spherical trailer hitch 90 which mates with an opening 92 in the structural member 20 extending rearwardly above the bicycle wheel 18. As illustrated in FIG. 1, the trailer hitch 90 is engaged with the opening 92 to both tow the trailer behind the bicycle and also to help secure the trailer in place on the structural member 20 as illustrated in FIG. 3. The trailer is also held in place upon the bicycle as illustrated in FIG. 3 by a pin 91 secured to the bridge portion of the trailer and extending forwardly to engage a slotted member 93 secured to the member 20 of the bicycle. The structural member 20 also includes pad means 94 and 96 for supporting the trailer when it is stowed in place upon the bicycle. The trailer is further secured in place upon the bicycle as illustrated in FIG. 3 by suitable stabilizing means for example, a spring 98 (see FIG. 3) may be connected with the bicycle on either side of its hub and extend upwardly for interconnection with the trailer. When the trailer is not mounted in place upon the bicycle, the spring 98 may be held in place upon the bicycle as illustrated in FIG. 1.

The cam member 84 for the other pivot 80 includes at least one stop such as that indicated at 86 for securing the draw bar portion 76 in configuration illustrated in each of FIGS. 1 and 2. In addition, as noted above, the draw bar portion 76 may be folded completely under the bridge portion 32 of the trailer. However, a stop for the spring loaded pin is not necessary in that position.

The spring loaded pins 88 for each of the pivot assemblies 80 and 82 are interconnected with a centrally arranged level 100 which may thus be operated to permit repositioning of either or both portions 76 and 78 of the draw bar.

Referring particularly to the side portion 42 illustrated in FIG. 4, an additional side panel 102 is pivotably interconnected with the side panel 68. When the trailer is in the fully extended position illustrated in FIG. 1, the side panels 102 for each of the side portions 42 and 44 may be pivoted into place to form front and back panels surrounding the trailer body 22. In the present embodiment, the lateral dimension of the trailer body 22 is somewhat greater than its longitudinal length. Accordingly, the side panels 102 are extensible in order to span the full width of the trailer body. Also, the free ends of the side panels 102 may be either pinned in place with the adjacent side panel 68 or locked in place relative to the side panel of the opposite trailer side portion by means of pins, one of which is indicated at 104 for the trailer side portion 42.

Accordingly, there has been described above a particularly effective bicycle-trailer combination wherein both the bicycle and trailer are adapted for use with the trailer being towed behind the bicycle in order to carry relatively substantial loads or for use of the trailer alone as a hand truck. In addition, both the trailer and bicycle include means for mounting the trailer in a collapsed configuration on the bicycle when the trailer is not is use. Additional modifications and variations besides those described above will be obvious within the scope of the present invention. Accordingly, the scope of the present invention is defined only by the following appended claims.

What is claimed is:

1. A trailer adapted for alternative use either to be towed behind a bicycle or the like or to be used as a hand truck, the trailer also being collapsible for storage upon the bicycle or the like, the trailer comprising a collapsible trailer body and a draw bar unit arranged at the forward end of the trailer body, the draw bar unit including a first elongated portion pivotably interconnected with the trailer body, a second draw bar portion pivotably interconnected with the first draw bar portion and means for locking the draw bar portions in a plurality of angled positions relative to each other and to the trailer body, the second draw bar portion including hitch means at its unpivoted end arranged for interconnection with hitch receiving means mounted upon the bicycle or the like.

2. The trailer of claim 1 in combination with a bicycle including a frame and front and rear wheels, the bicycle frame including a structural frame member extending rearwardly above its rear wheel, the structural frame member including hitch receiving means for engagement with said hitch means on the trailer draw bar, the two elongated portions of the draw bar being pivotable into parallel relation beneath the trailer to permit engagement of the hitch means with the hitch receiving means on the bicycle when the trailer is collapsed and mounted upon the structural frame member.

3. The trailer of claim 1 wherein the pivot connections between the first draw bar portion and the trailer and between the two draw bar portions respectively include adjustable stop means for fixing the draw bar portions in selected angular alignment with each other and with the trailer in order to adapt the trailer for towing behind the bicycle, for use as a hand truck or for mounting the trailer in a collapsed configuration upon a portion of the bicycle.

4. The trailer of claim 1 wherein the trailer body includes a centrally arranged bridge portion having a width selected to span a portion of the bicycle and side portions arranged on either side of the bridge portion being pivotable between collapsed positions for mounting the trailer upon the bicycle and extended positions for forming the trailer to be towed behind the bicycle.

5. The trailer of claim 4 further comprising parallelogram linkage means interconnecting the two trailer side portions with the bridge portion for maintaining wheels associated with the respective trailer side portions in vertical alignment with the trailer being either extended or collapsed for mounting upon the bicycle.

6. The trailer of claim 5 further comprising reinforcing elongated members forming part of the trailer bridge portion and each side portion to overlap with each other when the trailer is in its expanded configuration in order to provide additional reinforcing support for supporting a load placed upon the trailer.

7. The trailer of claim 3 further comprising means for selectively releasing and engaging the stop means for the two pivot assemblies in order to facilitate adjustment of the angular alignment between the two elongated portions of the draw bar with each other and with the trailer body.

8. A collapsible trailer body adapted either to be towed behind a bicycle or the like or to be carried upon a portion of the bicycle or the like, the trailer comprising a central longitudinally extending bridge portion for spanning a supporting portion of the bicycle or the like, side portions pivotably connected with opposite sides of the bridge portion, each trailer side portion including a wheel bracket for supporting a rotatable wheel, a parallelogram linkage effectively interconnecting the bridge portion with each of the wheel brackets in order to maintain the wheels in vertical alignment both when the trailer is expanded for towing behind the bicycle or collapsed for mounting upon a supporting portion of the bicycle, and a trailer draw bar including a first elongated draw bar portion and a second elongated draw bar portion pivotably interconnected with the first draw bar portion, the second draw bar portion including hitch means at its pivoted end.

9. The trailer of claim 8 in combination with a bicycle including a frame and front and rear wheels, the bicycle frame including a structural frame member extending rearwardly above its rear wheel, the structural frame member including hitch receiving means for engagement with said hitch means on the trailer draw bar, the first draw bar portion being pivotably interconnected to the forward end of the trailer body with the two elongated portions of the draw bar being pivotable into parallel relation beneath the trailer to permit engagement of the hitch means with the hitch receiving means on the bicycle when the trailer is collapsed and mounted upon the structural frame member.

10. The trailer of claim 9 wherein the pivot connections between the first draw bar portion and the trailer and between the two draw bar portions respectively include adjustable stop means for fixing the draw bar portions in selected angular alignment with each other and with the trailer in order to adapt the trailer for towing behind the bicycle, for use as a hand truck or for mounting the trailer in a collapsed configuration upon a portion of the bicycle.

11. The trailer of claim 8 further comprising reinforcing elongated members forming part of the trailer bridge portion and each side portion to overlap with each other when the trailer is in its expanded configuration in order to provide additional reinforcing support for supporting a load placed upon the trailer.

12. The trailer of claim 11 further comprising means for selectively releasing and engaging the stop means for the two pivot assemblies in order to facilitate adjustment of the angular alignment between the two elongated portions of the draw bar with each other and with the trailer body.

* * * * *

UNITED STATES PATENT AND TRADEMARK OFFICE

CERTIFICATE OF CORRECTION

PATENT NO. : 4,037,853

DATED : July 26, 1977

INVENTOR(S) : Carl K. Sparks

It is certified that error appears in the above-identified patent and that said Letters Patent are hereby corrected as shown below:

Column 1, line 20, change "is"to --in--.

Column 3, line 25, change "extension" to --extensions--.

Signed and Sealed this

*Eighteenth* Day of *October 1977*

[SEAL]

*Attest:*

RUTH C. MASON
*Attesting Officer*

LUTRELLE F. PARKER
*Acting Commissioner of Patents and Trademarks*